US 7,694,331 B2

(12) United States Patent
Vesikivi et al.

(10) Patent No.: US 7,694,331 B2
(45) Date of Patent: Apr. 6, 2010

(54) PHONE WITH SECURE ELEMENT AND CRITICAL DATA

(75) Inventors: Petri Vesikivi, Espoo (FI); Pekka K. Viitaniemi, Espoo (FI); Jarkko Sevanto, Helsinki (FI)

(73) Assignee: Nokia Corporation, Espoo (FI)

( * ) Notice: Subject to any disclaimer, the term of this patent is extended or adjusted under 35 U.S.C. 154(b) by 1075 days.

(21) Appl. No.: 11/095,532

(22) Filed: Apr. 1, 2005

(65) Prior Publication Data

US 2006/0224887 A1 Oct. 5, 2006

(51) Int. Cl.
*H04L 29/06* (2006.01)
*G06F 21/00* (2006.01)

(52) U.S. Cl. .......................... 726/9; 380/247
(58) Field of Classification Search ................. 713/150, 713/164, 166, 172, 168, 182, 185, 189, 193; 380/149, 150, 270; 726/2–5, 10, 16, 17, 726/20, 21, 26–28, 9
See application file for complete search history.

(56) References Cited

U.S. PATENT DOCUMENTS

| 5,027,955 | A  | 7/1991  | Shoemaker et al. |
| 5,120,942 | A  | 6/1992  | Holland et al. |
| 6,006,331 | A  | 12/1999 | Chu et al. |
| 6,161,182 | A  | 12/2000 | Nadooshan |
| 6,424,264 | B1 | 7/2002  | Giraldin et al. |
| 6,614,351 | B2 | 9/2003  | Mann et al. |
| 6,747,562 | B2 | 6/2004  | Giraldin et al. |
| 6,928,468 | B2 | 8/2005  | Leermakers |
| 7,028,090 | B2 | 4/2006  | McBrearty et al. |
| 7,072,672 | B1 | 7/2006  | Vanska et al. |
| 2001/0052083 | A1 | 12/2001 | Willins et al. |
| 2002/0175211 | A1 | 11/2002 | Dominquez et al. |
| 2003/0005118 | A1 | 1/2003  | Williams |
| 2003/0033526 | A1* | 2/2003 | French et al. ................ 713/168 |
| 2003/0043040 | A1 | 3/2003  | Zeps et al. |
| 2003/0101347 | A1 | 5/2003  | Letsinger |
| 2003/0197612 | A1 | 10/2003 | Tanaka et al. |

(Continued)

FOREIGN PATENT DOCUMENTS

DE 10103266 A1 4/2002

(Continued)

OTHER PUBLICATIONS

U.S. Appl. No. 10/930,002, filed Aug. 30, 2004, Vesikivi et al.

(Continued)

*Primary Examiner*—Gilberto Barron, Jr.
*Assistant Examiner*—Abdulhakim Nobahar
(74) *Attorney, Agent, or Firm*—Locke Lord Bissell & Liddell

(57) ABSTRACT

A wireless communication device is implemented with a smart card module to secure the transmission of sensitive or confidential information. The user of the device must request permission to activate an application on the smart card module from a remote source. After this first level of security is satisfied, the application on the smart card module enables the user to scan data via a machine-readable medium in order to make a data request to the remote source. If a second level authorization is met in regard to the data request, the remote source will transmit the requested sensitive or confidential information to the user to view and/or update.

22 Claims, 8 Drawing Sheets

U.S. PATENT DOCUMENTS

| | | |
|---|---|---|
| 2003/0197621 A1 | 10/2003 | Field et al. |
| 2003/0203730 A1 | 10/2003 | Wan et al. |
| 2003/0236991 A1 | 12/2003 | Letsinger |
| 2004/0061646 A1 | 4/2004 | Andrews et al. |
| 2004/0087273 A1 | 5/2004 | Perttila et al. |
| 2004/0119814 A1* | 6/2004 | Clisham et al. .......... 348/14.08 |
| 2004/0166807 A1 | 8/2004 | Vesikivi et al. |
| 2005/0111457 A1 | 5/2005 | Kumar |
| 2005/0116811 A1 | 6/2005 | Eros et al. |
| 2005/0210264 A1 | 9/2005 | Vesikivi et al. |
| 2006/0094421 A1 | 5/2006 | Munje et al. |
| 2006/0184681 A1 | 8/2006 | Bernardi et al. |
| 2006/0208857 A1 | 9/2006 | Wong |

FOREIGN PATENT DOCUMENTS

| | | |
|---|---|---|
| GB | 2 392 331 A | 2/2004 |
| JP | 2002-205823 | 7/2002 |
| WO | WO 99/17230 | 4/1999 |
| WO | WO 01/73687 A2 | 10/2001 |
| WO | WO 03/088156 A2 | 10/2003 |
| WO | WO 2004/003801 A1 | 1/2004 |
| WO | WO 2004/025575 A1 | 3/2004 |

OTHER PUBLICATIONS

U.S. Appl. No. 10/802,414, filed Mar. 16, 2004, Vesikivi et al.

International Search Report mailed Jul. 10, 2006 cited in corresponding PCT Appln. No. PCT/IB2006/000699.

* cited by examiner

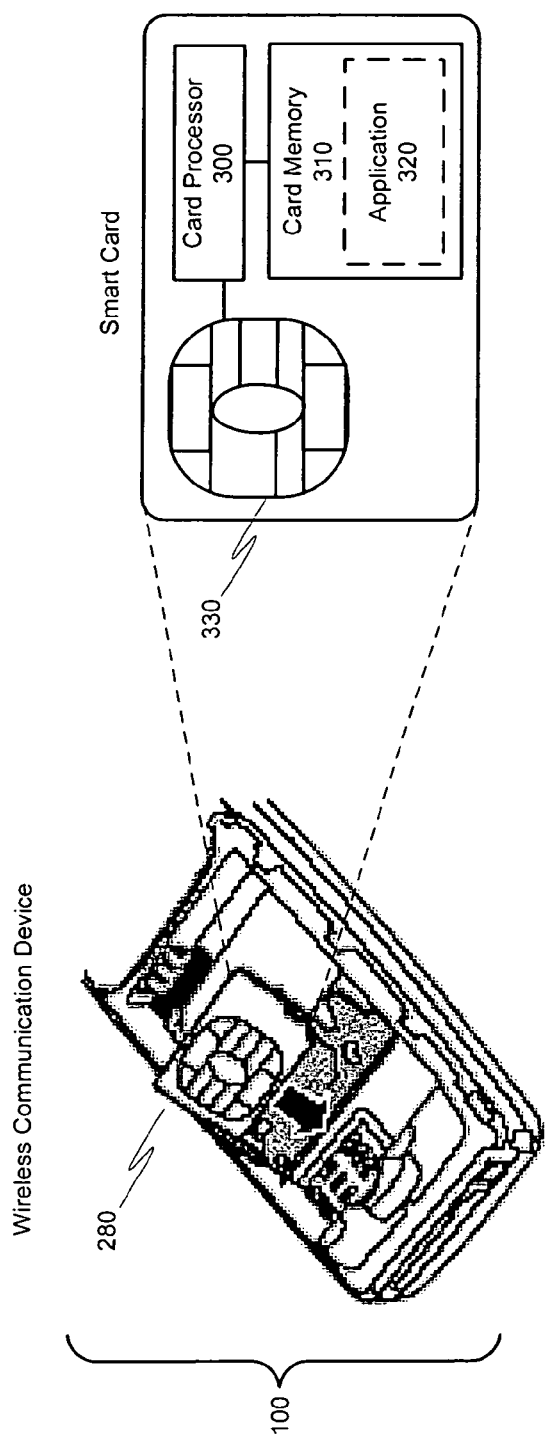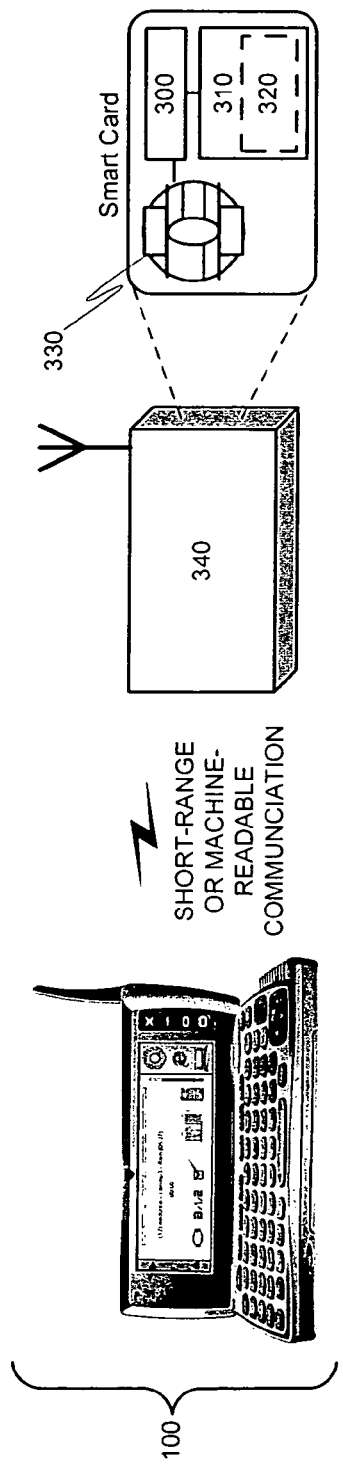
FIG. 3A
FIG. 3B

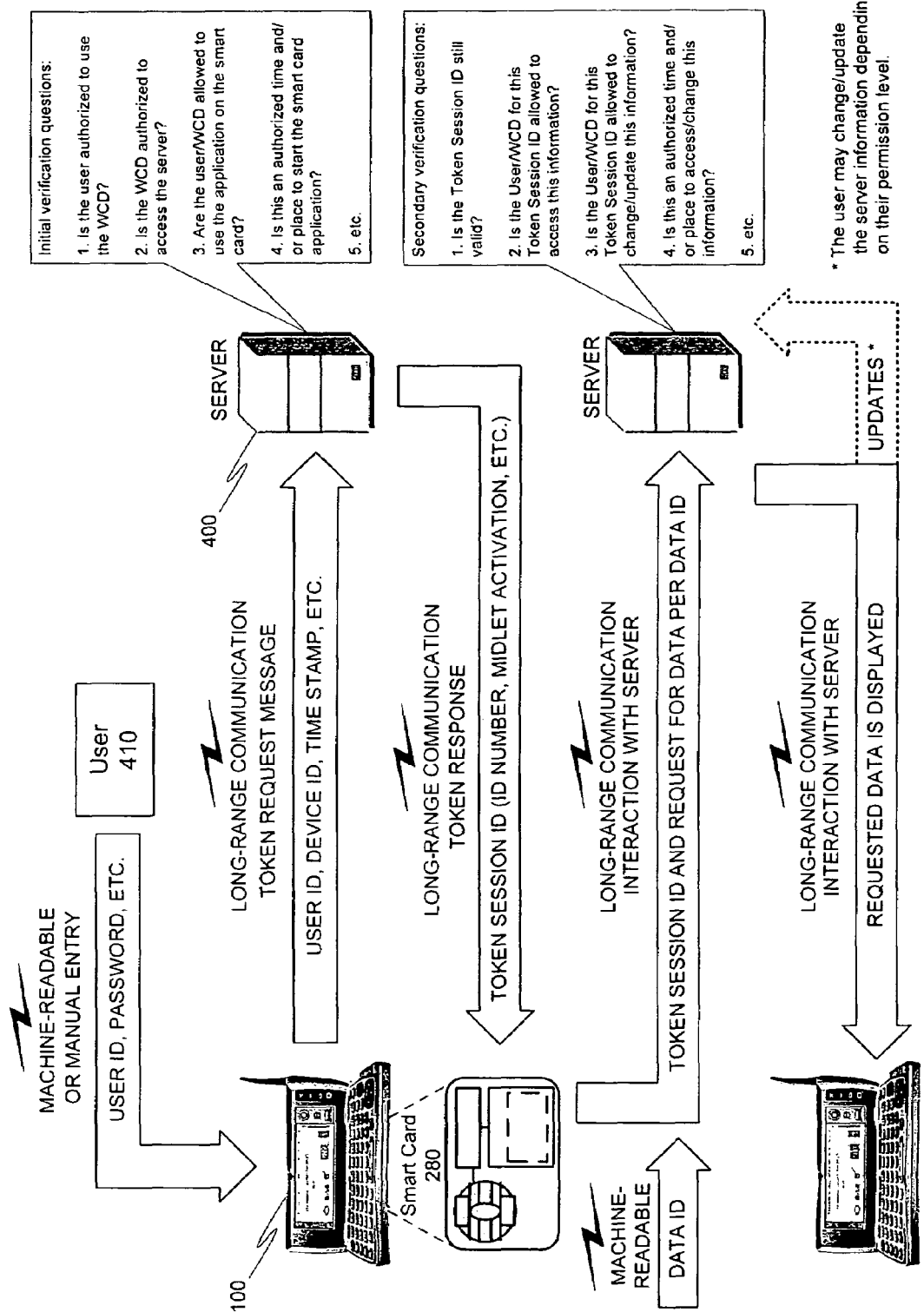

PHONE WITH SECURE ELEMENT AND CRITICAL DATA

RELATED CASE

This application is related to application Ser. No. 10/802,414 filed Mar. 16, 2004, entitled, SYSTEM AND METHOD FOR SESSION PROVISION and application Ser. No. 10/930,002 filed Aug. 30, 2004, entitled, "SYSTEM AND METHOD FOR WORKER SUPERVISION", assigned to Nokia Corporation.

BACKGROUND OF INVENTION

1. Field of Invention

The present invention relates to wireless communications. More particularly, the present invention relates to the use of a wireless communication device incorporating a secured smart card module to transmit and receive sensitive or confidential information.

2. Description of Prior Art

A wireless communication device (WCD) may communicate over a multitude of networks. Cellular networks facilitate WCD communications over large geographic areas. For example, the Global System for Mobile Telecommunications (GSM) is a widely employed cellular network which communicates in the 900 MHZ-1.8 GHZ band in Europe and at 1.9 GHZ in the United States that provides voice communication and supports the transmission of textual data via the Short Messaging Service (SMS). SMS allows a WCD to transmit and receive text messages of up to 160 characters. It also provides data transfer to packet networks, ISDN and POTS users at 9.6 Kbps. While cellular networks like GSM are a well-accepted means for transmitting and receiving data, due to cost, traffic and legislative concerns, a cellular network may not be appropriate for all data applications.

Bluetooth™ is a short-range wireless network technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. A plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other members of the piconet.

More recently, WCDs have began to incorporate various devices providing enhanced functionality for facilitating close-proximity information exchanges. Sensors and/or scanners may be used to read visual or electronic information into a device. The transaction may involve a user holding their WCD in proximity to a target, aiming their WCD at an object (e.g., to take a picture) or sweeping the device over a tag or document. Machine-readable technologies such as radio frequency identification (RFID), optical character recognition (OCR) and various other types of visual, electronic and magnetic scanning are used to input information useful to the user.

Worldwide, the use of WCDs has flourished due to the aforementioned increases in quality and functionality. These devices combine the ability to reliably relay various forms of information into a single compact package. These benefits have allowed professionals to create new business paradigms providing better and faster service, resulting in increased satisfaction for their customers without having to suffer additional workload.

There are many examples of improvements in the workplace realized from the advent of wireless communications. At the lowest level, WCDs often replace walkie-talkies or CB radios for communication between workers. However, greater functionality in WCDs have led to additional applications. Workers may now use a WCD to review electronic schedules for their work day, receive visual or audio instructions as to how to complete their jobs, track their progress by scanning job site time/geographic markers or by taking digital pictures of completed procedures, and relay status relevant information back to a central information repository. All of this can be done from one portable device, alleviating the need for inefficient paper handing.

There are some applications, however, that have resisted the "wireless revolution." For example, doctors are entrusted with sensitive information in regard to the treatment of their patients. Currently, if a doctor, or another health professional, were to make a house call, she would have to carry a paper version of the patient's medical history to both establish the current condition of the patient, and to update the file with the procedures performed during the visit. This situation would seem to be a perfect opportunity for improvements involving wireless communications. Ideally, a practitioner would carry a WCD with them to request medical information about a patient and could subsequently update a patient's file electronically. However, the information related to the patient is confidential. No one except the health professional should be able to access this information. A lack of security regarding accessing applications in a WCD, and in the transmission of the sensitive or confidential information to a user authorized to see this data, has prevented the advent of wireless communications in this arena.

Therefore, what is needed is a method and apparatus for securing a wireless communication device, the applications on the device and the transmission of information to and from the device, so as to ensure that sensitive or confidential information remains secure.

SUMMARY OF INVENTION

The instant invention provides a solution to problems seen in the prior art by providing a method, system, apparatus and computer program for using a WCD to exchange sensitive or confidential information in a secured manner.

The invention includes a WCD and a secured smart card module residing within the WCD. The smart card module may be implemented as a feature built into the WCD, as a separate unit residing within the device, or as a stand-alone module communicating with the WCD via short-range communications/machine-readable data. The secured smart card module may be directly connected to at least the long range communications and a short-range input device in the WCD. The module includes at least a card processor, an interface for communicating with the WCD, and a card memory containing at least a secured application that may not be activated locally by the user.

The invention requires a first level authentication. The first level authentication information is related to the user, the device and whether the user is authorized to utilize the device/secured application stored within the memory of the smart card module. The user communicates the first level authentication information to a remote source, such as a server. The server may then respond with a message containing information, such as session token, allowing the WCD to initiate the secured application on the smart card module to request sensitive or confidential data from the remote source.

After the first level authentication, the application on the smart card module presents a user interface to the user of the WCD. The user interface allows the user to scan required data from a wireless tag or information point into the WCD. The scanned information is at least one constituent of a second level authentication. The scanned information may be relayed by the secured smart card module application to a remote source along with information related to the first level authentication, such as the session token ID. If the second level authentication is permitted, sensitive or confidential information may be relayed back the WCD. The user may then view and/or update the information on the WCD and transmit updates back to the server if the user is authorized to make changes to the information.

Various safety measures may be implemented to secure the communications between the WCD and the remote source. These measures are not limited to verifying the user identity using information obtained from a machine-readable tag, checking various rules to make sure that a user is approved to view the information given the current time, location, etc., and encoding or encrypting transmissions to and from the WCD. The token session ID may also be limited by set time, duration, number of information requests, geographical location, etc. in order to prevent the transfer of information should the device be lost or stolen.

DESCRIPTION OF DRAWINGS

The invention will be further understood from the following detailed description of a preferred embodiment, taken in conjunction with appended drawings, in which:

FIG. 3A is a representation of an installable smart card module housed within a wireless communication device, and the components included within the smart card module in accordance with an embodiment of the present invention.

FIG. 3B is a representation of a smart card module housed within a stand-alone unit that communicates with a wireless communication device via short range communication in accordance with an embodiment of the present invention.

FIG. 4 is a representation of an information exchange between a wireless communication device and a remote source in accordance with an embodiment of the present invention.

DESCRIPTION OF PREFERRED EMBODIMENT

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

Figure 1:
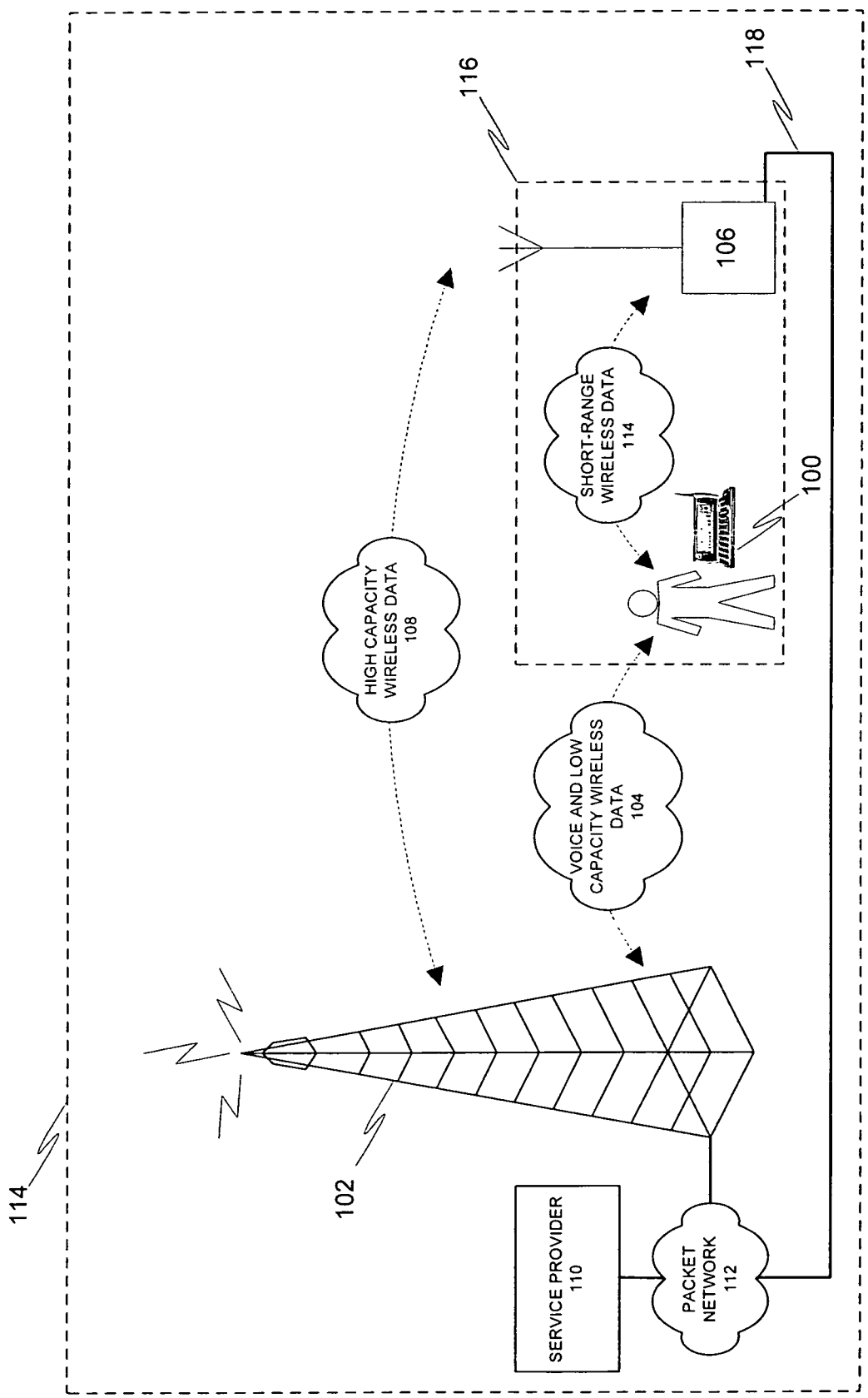
FIG. 1 is a representation of typical wireless communication networks and how these networks interact with a user having a wireless communication device.

Before describing the invention in detail, it is helpful to describe an environment in which the invention may be used. Accordingly, FIG. 1 is a diagram of an exemplary operational environment in which a WCD 100 may collect and consume data according to the techniques of the present invention.

WCD 100 is capable of engaging in various types of wireless communications. For instance, WCD 100 may engage in long range cellular communications 104 (e.g., GSM), as well as short-range communications 114. Examples of short-range communications are not limited to Bluetooth™, WLAN (i.e., IEEE 802.11), and/or ultra wideband (UWB) transmission. As shown in FIG. 1, WCD 100 may enter within communications range of an access point 106. This communications range is defined by a coverage area 116, which determines the locations at which these devices may communicate.

When WCD 100 is within coverage area 116 of access point 106, it may enter into a short-range communications connection with access point 106. Once this connection is established, access point 106 may provide information to WCD 100 regarding various available services. This information may include one or more links or shortcuts to such services. These links may be transmitted to WCD 100 in an arrangement or data structure such as a service bookmark.

WCD 100 is also capable of communicating by employing short-range scanning of a target object containing machine-readable data. For instance, RFID communications can be utilized to scan a target object located within, or in proximity to, an access point 106. Such communications may occur at a very close proximity (e.g., almost touching). Accordingly, for RFID communications, coverage area 116 may only span in the range between 1-2 inches to a few feet.

Various service providers 110 provide these services. In the environment of FIG. 1, WCD 100 communicates with service providers 110 across a backbone network 114. FIG. 1 shows that backbone network 114 includes a packet-based network 112 (e.g., the Internet) and a cellular network 102. Cellular network 102 may include base stations and a mobile switching center. However, these implementations are provided for purposes of illustration, In fact, other network types and arrangements are within the scope of the present invention.

Backbone network 114 is also used for the accumulation of links by access points 106. For instance, each service provider 110 may transmit information regarding its services to access point 106 via a high capacity wireless data network 108 (e.g., GPRS). Alternatively, an access point 106 may be connected to the packet network 112 via hardwire network connection 118. The information transmitted from the service provider may include data (e.g., bookmarks) to be collected by WCD 100. In addition, backbone network 114 may be used by WCD 100 to obtain further data from service providers 110 related to bookmark information received from access point 106.

II. Wireless Communication Device

Figure 2:
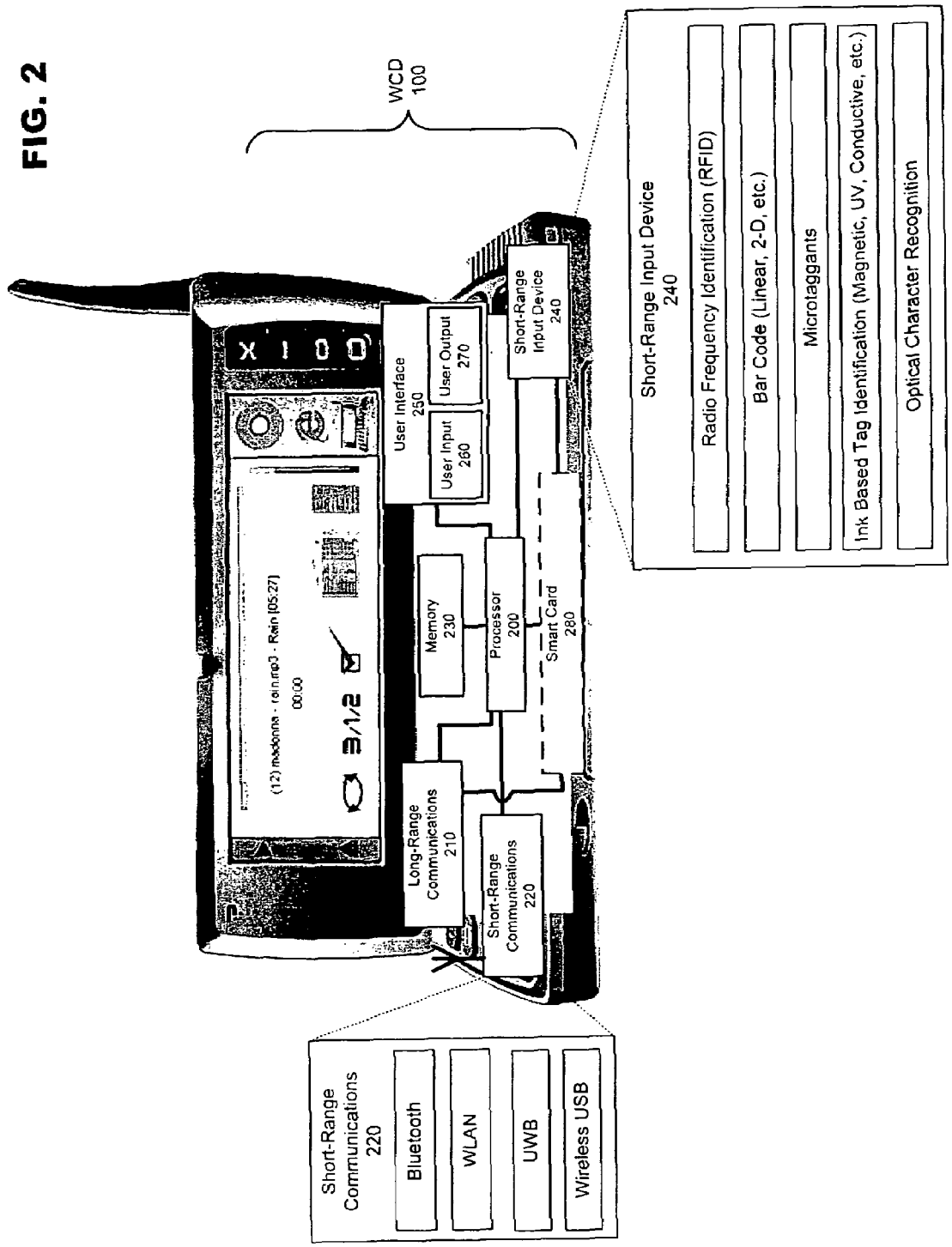
FIG. 2 is a representation of a wireless communication device and the functional components included within the device as implemented in accordance with an embodiment of the present invention.

FIG. 2 discloses an exemplary functional layout of WCD 100. Processor 200 controls the overall device operation. As shown in FIG. 2, processor 200 is coupled to communications sections 210 and 220. Processor 200 may be implemented with one or more microprocessors that are each capable of executing software instructions stored in memory 230.

Memory 230 may include random access memory (RAM), read only memory (ROM), and/or flash memory, and stores information in the form of data and software components (also referred to herein as modules). The data stored by memory 230 may be associated with various software modules used to control the functionality of WCD hardware components 200 through 280.

The software components stored by memory 230 include instructions that can be executed by processor 200. Various types of software components may be stored in memory 230. For instance, memory 230 may store software components that regulate the operation of communication sections 210 and 220. Also, memory 230 may store software components that provide control and conversion functionality for short range communications device 240, control modules for user interface manager 250, interface software for smart card module 280, and any ancillary control and/or communication utilities utilized by WCD 100.

Long-range communications 210 performs functions related to the exchange of information across long-range communications networks (such as cellular networks) via an antenna. Therefore, long-range communications 210 may operate to establish data communications sessions, such as General Packet Radio Service (GPRS) sessions and/or Universal Mobile Telecommunications System (UMTS) sessions. Also, long-range communications 210 may operate to transmit and receive messages, such as short messaging service (SMS) messages and/or multimedia messaging service (MMS) messages.

Short-range communications 220 is responsible for functions involving the exchange of information across short-range wireless connections. As described above, examples of such connections include Bluetooth™, WLAN and UWB connections. Accordingly, short-range communications 220 may perform functions not limited to the automated establishment of short-range connections, security and/or permission control validating approved connections, and processing related to the transmission and reception of information via such connections.

Short-range input device 240, as depicted in FIG. 2, may provide functions related to the capture and interpretation of machine-readable information. For instance, in the case of RFID communications, processor 200 or another control component may trigger short-range input device 240 to generate radio frequency signals for activating an RFID transponder, and may in turn control the reception of signals from RFID transponders. Other short-range communications functionality that may be supported through the short-range input device 240 are not limited to bar code readers including processes related to interpreting UPC labels, microtaggants, optical character recognition devices and magnetic ink character recognition devices also depicted in FIG. 2. It should be noted that the short-range input device 240 may also be capable of two-way communications according to embodiments of the present invention. In at least one non-limiting embodiment, the short-range input device 240 may provide a two-way communications interface between the WCD 100 and external communication sources, such as, for example another WCD or write-enabled RFID transponders.

Further shown in FIG. 2, user interface 250 is also coupled to processor 200. User interface 250 facilitates the exchange of information with a user. FIG. 2 shows that user interface 250 includes a user input 260 and a user output 270. User input 260 may include one or more components that allow a user to input information. Examples of such components include keypads, touch screens, and microphones. User output 270 allows a user to receive information from the device. Thus, user output portion 270 may include various components, such as a display, Light emitting diodes (LED), tactile emitters and one or more audio speakers. Exemplary displays include liquid crystal displays (LCDs), and other video displays.

Hardware corresponding to communications sections 210 and 220 provide for the transmission and reception of signals, as well as providing an interface of these sections with other components within the WCD. Accordingly, these portions may include components (e.g., electronics) that perform functions, such as modulation, demodulation, amplification, and filtering. These portions may be controlled by communications modules stored in memory 230.

The elements shown in FIG. 2 may be constituted and coupled according to various techniques. One such technique involves coupling separate hardware components corresponding to processor 200, communications sections 210 and 220, memory 230, short-range input device 240, user interface 250, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 250 may interact with a communications utilities module, also contained in memory 230, which provides for the establishment of service sessions using long-range communications 210 and/or short-range communications 220. The communications utilities module may include various components that allow the reception of services from remote devices according to protocols, such as the Wireless Application Protocol (WAP).

When engaging in WAP communications with a remote server, the device functions as a WAP client. To provide this functionality, the module may include WAP client software having components, such as a Wireless Markup Language (WML) Browser, a WMLScript engine, a Push Subsystem, and a Wireless Protocol Stack.

Applications (not shown) may interact with the WAP client software to provide a variety of communications services. Examples of such communications services include the reception of Internet-based content, such as headline news, exchange rates, sports results, stock quotes, weather forecasts, multilingual phrase dictionaries, shopping and dining information, local transit (e.g., bus, train, and/or subway) schedules, personal online calendars, and online travel and banking services.

The WAP-enabled device may access small files called decks which each include smaller pages called cards. Cards are small enough to fit into a small display area that is referred to herein as a microbrowser. The small size of the microbrowser and the small file sizes are suitable for accommodating low memory devices and low-bandwidth communications constraints imposed by wireless links.

Cards are written in the Wireless Markup Language (WML), which is specifically devised for small screens and one-hand navigation without a keyboard. WML is scaleable so that it is compatible with a wide range of displays that covers two-line text displays, as well as large LCD screens found on devices, such as smart phones, PDAs, and personal communicators. WML cards may include programs written in WMLScript, which is similar to JavaScript. However, through the elimination of several unnecessary functions found in these other scripting languages, WMLScript reduces memory and processing demands.

III. Smart Card Module

The smart card module, nominally described as item 280 in FIG. 2, is now described in more detail. The smart card module is available in a multitude of configurations. It may be integrated into the hardware of the WCD, be included as an installable sub-component to the device, or be housed in a separate accessory device. FIG. 3A shows an exemplary WCD 100 including an installable smart card module 280. In at least one configuration, the module is embodied as a smart card, which is enclosed in a plastic shell with exposed terminals 330 that mate with an interface socket on the WCD 100. The interface socket may be an externally accessible slot or port, or may require a panel or cover to be removed in order to access the card (as shown in FIG. 3A). FIG. 3B shows an alternate embodiment of the present invention wherein the smart card module resides in an accessory device 340. The WCD may access the smart card by communicating with device 340 via short-rage communications 220 (e.g., Bluetooth™) or via short-range input device 240 (e.g., via RFID communication).

The smart card module 280 includes at least a card processor 300 and a card memory 310. The card processor may control access to the card and/or may run an application 320 stored in card memory 310. The application 320 on the smart card module 280 may consist of software routines to control access to the contents of card memory 310 including the ability to run executable programs or access sensitive or confidential data also located in card memory 320.

The smart card module may be directly coupled to components within the WCD in a variety of configurations. An exemplary configuration is shown in FIG. 2. Processor 200 is connected to smart card module 280, allowing the WCD to access/activate the smart card module. Smart card module 280 is also coupled directly to at least long-range communications 210 and short range input device 240. This allows the card processor 300 to directly access these WCD resources in a secure manner when application 320 requires information to be transmitted or received. The smart card module may also be directly coupled to other components of the WCD 100 depending on the requirements of the application/card.

IV. Operation

The operation of the present invention will now be described. The rudimentary functionality of the invention is depicted in FIG. 4. Here, an interaction is described between a user, a WCD and a remote source. User 410 initiates the transaction by entering an identification and/or password into WCD 100. This input may be executed via manual entry, for instance via a keypad on the WCD 100, or by short-range transmission to the device. The user may have a machine-readable tag contained in an identification card, keychain, bracelet, etc. that transfers some or all of the required information to WCD 100.

After the required user information is entered into the WCD 100, the device may perform an initial check to see if the user is an authorized user of the device (not shown). Provided that the user is authorized to utilize the device, the WCD 100 transmits a token request message to a remote source, here shown as information server 400. The authorization information may include, but is not limited to, user information, device information, smart card module information, time stamp information, geographic information, etc. The authorization is essentially a token request message to the server, requesting a permission to execute some action on the WCD provided that all of the information supplied to the remote source is correct. The message may be sent via various forms of long-range communication.

The server 400 checks the information supplied by the WCD 100 to determine whether a token should be supplied to the device. The server 400 may compare the user ID to various tables or databases to determine whether the user is authorized to use the smart card module 280 contained in WCD 100, authorized to access server 400, authorized to perform the requested actions at the submitted time and/or place, etc.

If all the information complies with the allowable conditions, the server 400 will remit to the WCD 100 a token via long-range communication. The token may contain information including a token session ID, access codes to card memory 310, activation codes for various midlet applications 320 on the smart card module 280, etc. The WCD 100 uses this information to activate the secured applications stored in the card memory 310 of the smart card module.

Figure 5:
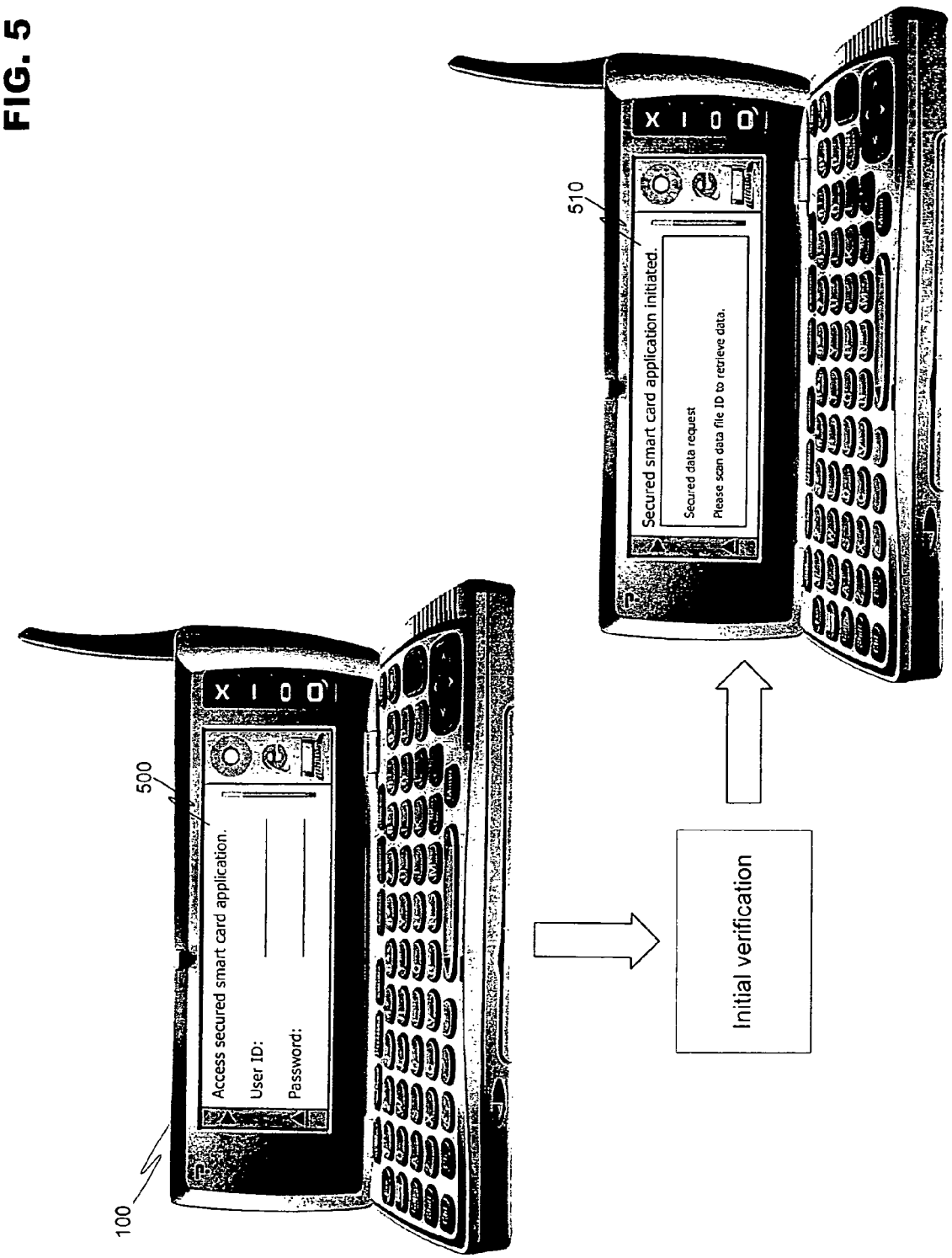
FIG. 5 is a representation of an exemplary user interface for accessing a secured application residing on a smart card module in accordance with an embodiment of the present invention.

The applications stored in the memory of the secured smart card module may furnish to the user a user interface tailored to requesting access to sensitive or confidential information. Examples of these user interfaces are shown in FIG. 5. The user interface 500 shown on the WCD 100 requests a user to input identification. The previously described process then executes to determine whether the current user is entitled to access the secured application 320 on smart card module 280. If all of the requirements are met, the user is presented with another display shown at 510. The WCD acknowledges that the secured application on the smart card module has been initiated. The secured application may then provide another window for instructing or providing information to the user. In the example in FIG. 5, user interface 510 includes a smaller window for the secured application advising the user how to initiate a secured data request.

Figure 6:
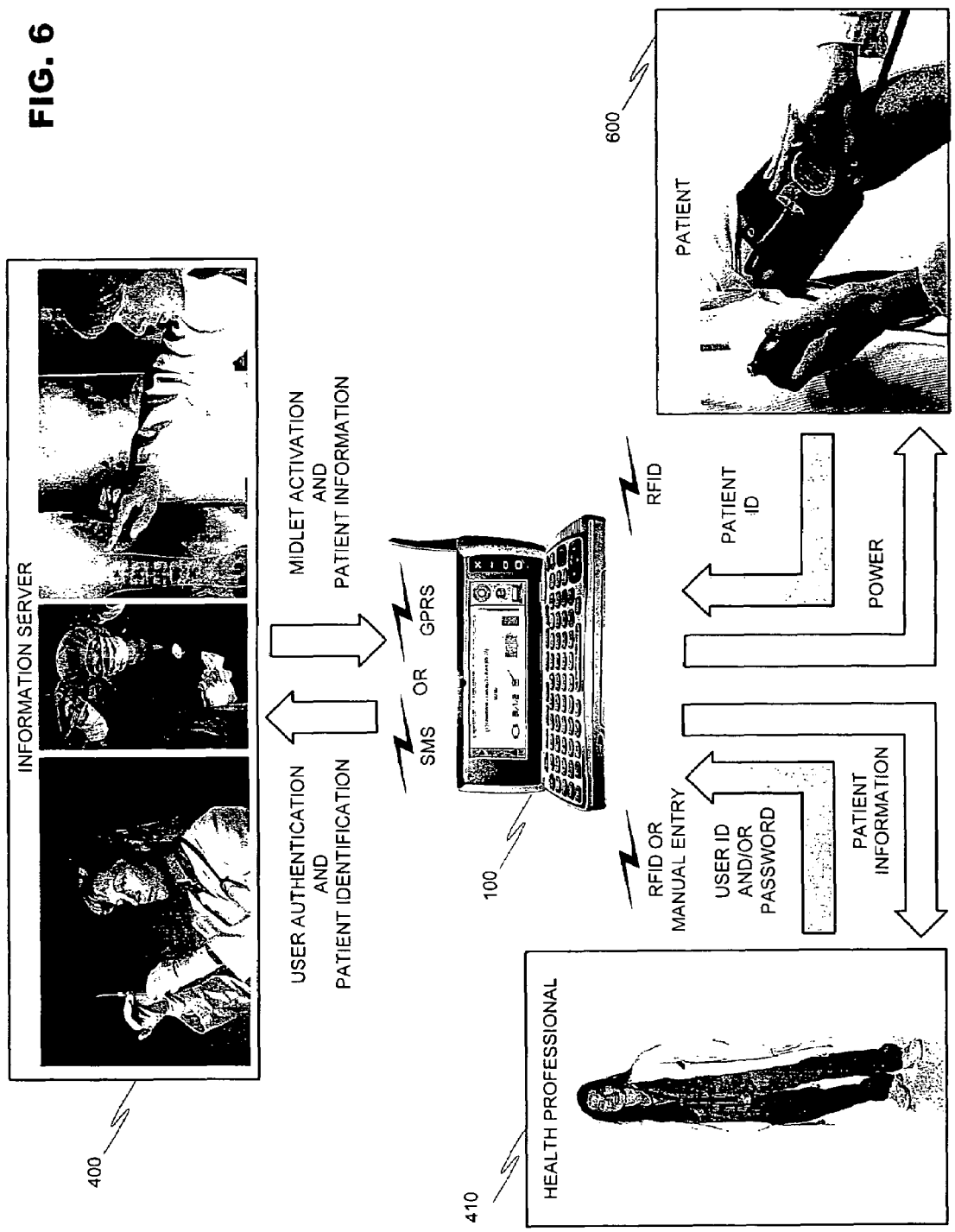
FIG. 6 is a representation of an exemplary application of the instant invention involving a health professional accessing information related to patient care in accordance with an embodiment of the present invention.

After the user has been authorized, the token has been received into WCD 100 and the secured application 320 has been initiated, the user may then utilize the aforementioned user interface 510 to transmit and receive sensitive or confidential data from server 400. In the FIG. 5 example, the secured application 320 asks for the identification of data to be retrieved. The secured application 320 requires the data to be scanned (it may not be manually entered). Smart card module 280 is directly coupled to the short-range input device 240, and may read machine-readable data via a number of different methods. In the embodiment of FIG. 6, data is read via RFID transmission into the secured application, but this information may also be inputted via OCR, magnetic sensor, etc. The card processor 300 on smart card module 280 then initiates communications with server 400 via long-range communications 210. The message may be sent using various long-range communication methods. The message contains at least information related to the token session ID and a requested data ID in accordance with the previously scanned machine-readable information. The server 400 evaluates the request for sensitive or confidential data in view of the token session ID and requested data ID to determine if a second level authorization has been achieved. In this analysis, the server 400 may check whether the token session ID is still valid, whether the user/device associated with the token session ID is allowed to access the requested information, whether the user/device is allowed to update/change the requested information, is the user authorized to access this information in view of the current time/location of the user, etc.

If all of the information provided by user 410 complies with the requirements of the second authorization verification, the server 400 remits the requested information back to the user via long-range communications. This transmission may be encrypted or encoded so as to prevent the information from being intercepted and read. The information is then displayed for the user 410 on the WCD 100. User 410 may read and/or update this information if they are qualified by the system to make changes. This qualification may be determined by a database, table, etc. located in the server 400.

Enhanced security may be enforced by limiting the parameters of the communication session. The token session ID may be limited so that the secured connection to the server is not permanent. A set time of day, a duration, a maximum number of transactions, a geographical limitation, etc. may be imposed on the token session ID so that, for example, the session times out after a predetermined duration, disconnects from the server 400 and deactivates the secured application 320. The user would then have to reinitiate the process depicted in FIG. 4 to reconnect to the server. This enhanced security measure may be implemented to prevent an unauthorized user from accessing any sensitive or confidential information if the WCD 100 should become lost or stolen.

Figure 7:
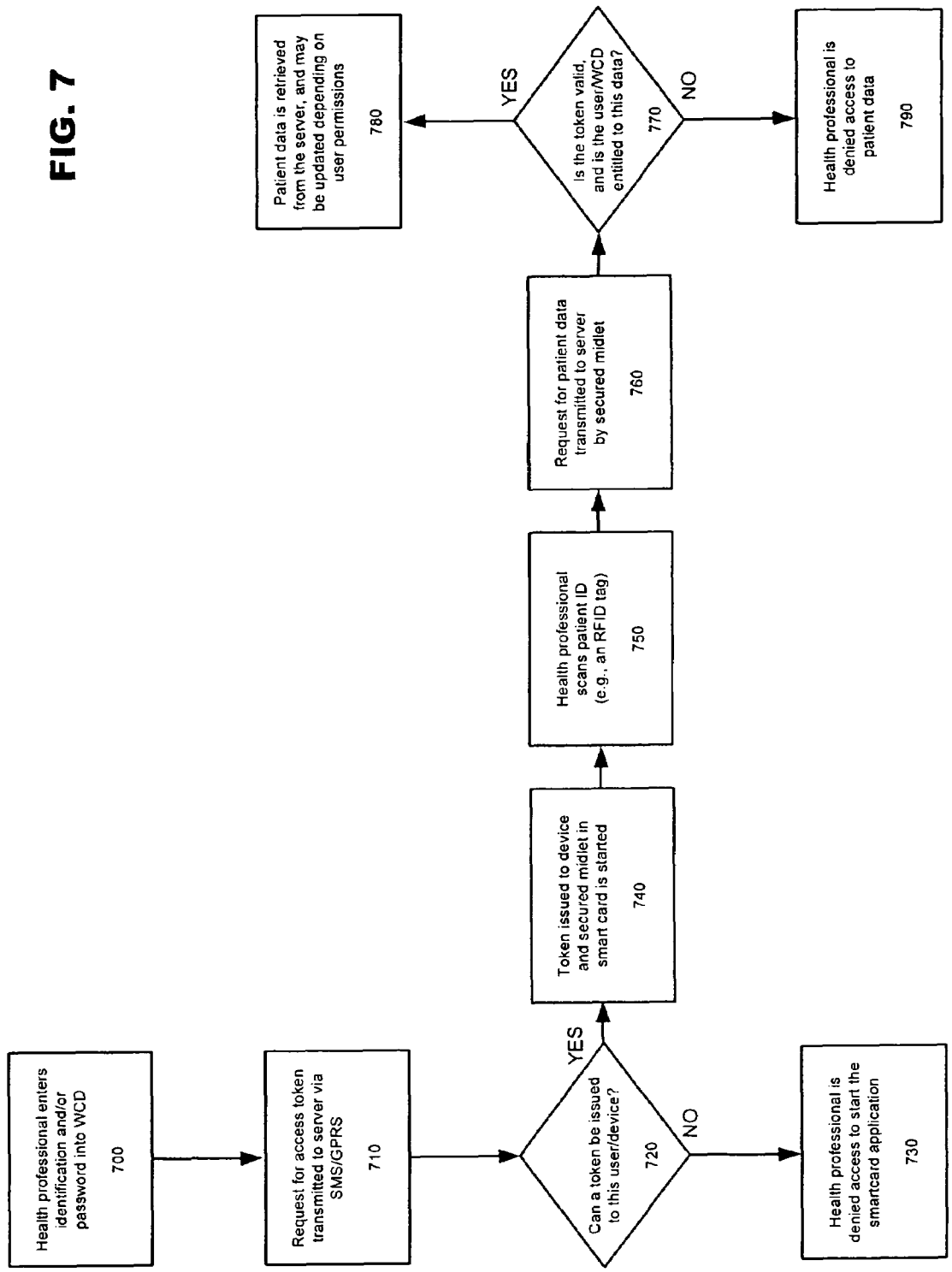
FIG. 7 is a flow chart representing the execution of the exemplary application of FIG. 6 in accordance with an embodiment of the present invention.

FIGS. 6 and 7 demonstrate at least one embodiment of the present invention. In this application, the interaction of a health professional (user) 410, a patient 600 and a remote source (server) 400 are represented pictorially in FIG. 6 and via a flow chart in FIG. 7.

In step 700, the user 410, in this case a health professional, enters her name and/or password into WCD 100. As an additional security measure, the health professional 410 may instead be required to scan machine-readable identification, for example from a ID card or badge containing an RFID tag, into the WCD 100. In step 710 the WCD 100 requests a token from server 400. The request may contain information identifying the health professional 410, the WCD 100, the secured smart card module 280, the time of the request, etc. The server evaluates the information provided by the WCD 100 in step 720. If the authorization is disallowed, the server 400 does not issue a token and the health professional is denied access to start the secured midlet application 320 (step 730). Otherwise, in step 740 the server 400 issues a token session ID and authorization to start the smart card secured midlet application 320.

The application 320 presents a user interface 510 to the health professional 410 requesting her to scan the patient's ID. According to a non-limiting embodiment of the present invention, the patient 600 may have a machine-readable tag in a bracelet, necklace or even implanted under her skin. The health professional 410 holds the WCD 100 proximate to the patient 600. In the case of an RFID tag, the scanning function of the WCD provides energy to the RFID tag, triggering the tag to transmit patient identification data which is captured by WCD 100 (step 750). The requirement for scanning the patient ID information prevents a person who knows the patient's ID number, but is not present with the patient or authorized to view the patient's medical history, from accessing the confidential medical records.

In step 760, the WCD sends at least the token session ID information and the patient ID information to server 400. Server 400 may contain the medical history of the patient including the patient's history of illness, immunization data, prior surgical and related treatment data, x-ray information, allergies, etc. The server 400 at step 770 determines whether, based on the token session ID and the patient ID, whether the health professional 410 is entitled to the requested information. The server may invalidate the request if the token has expired, the patient is not currently under the care of the requesting medical professional, the request was made at a time and/or location barred from receiving the information, etc. If the request is denied, the health professional 410 is denied the requested data in step 790. If the request is granted, the server 400 may encode or encrypt the data prior to sending it to WCD 100. The health professional 410 may then view and/or update the information based on their visit with the patient 600. Updated information may include symptoms observed, procedures completed and/or medicines administered by the health professional 410 during her visit. At the conclusion of the visit, the health professional 410 may manually terminate the secured connection and/or deactivate application 320, or allow the session to time out, etc.

Figure 8B:
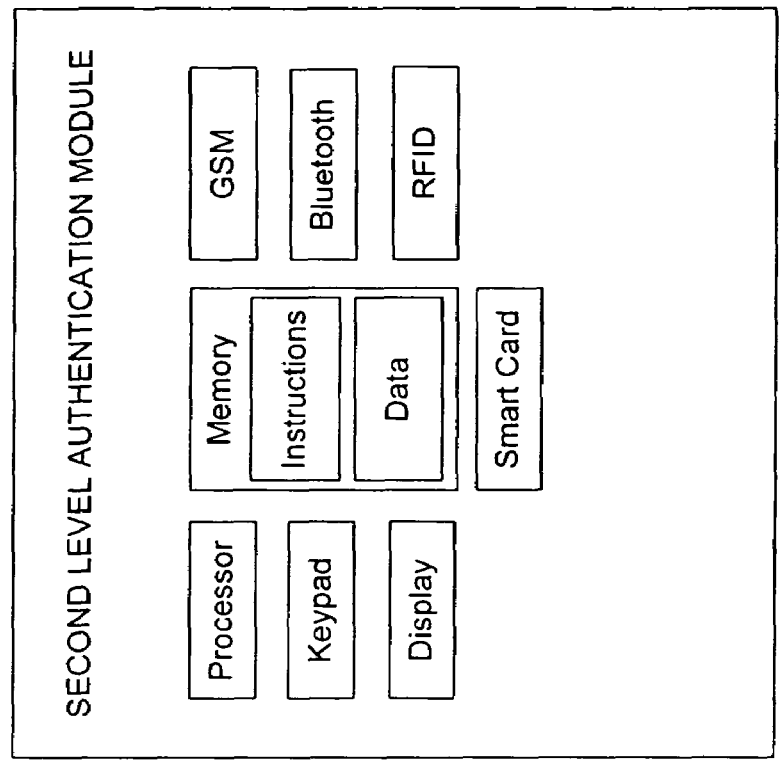
FIG. 8B is a modular representation of the second level authentication method in accordance with an embodiment of the present invention.
Figure 8A:
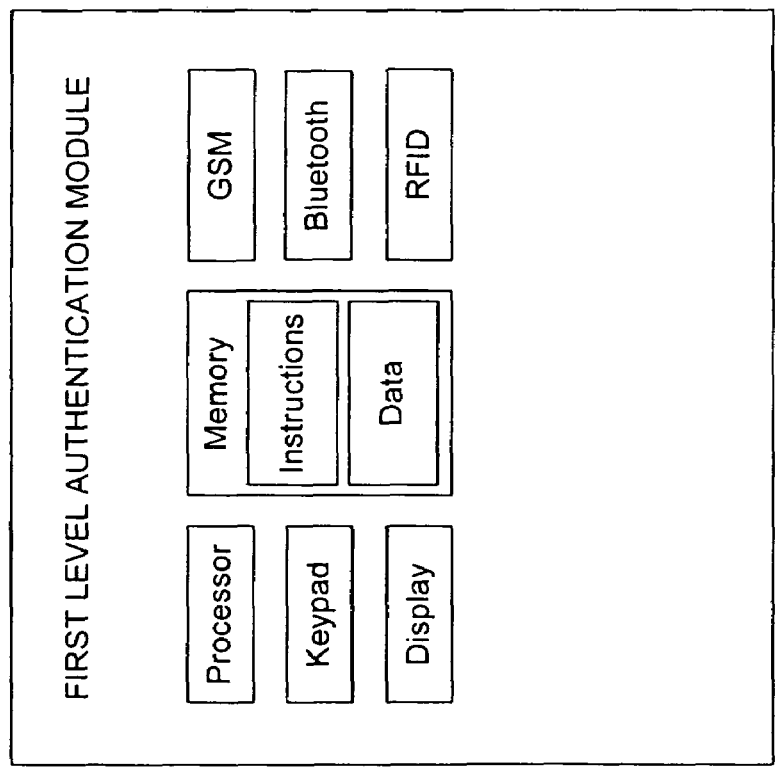
FIG. 8A is a modular representation of the first level authentication method in accordance with an embodiment of the present invention.

FIGS. 8A and 8B demonstrate how, in at least one embodiment of the present invention, the various process steps are linked to the functional resources for executing those steps. The first process of the invention is the first level authentication module. FIG. 8A discloses exemplary resources involved in this transaction. A processor executes code or instructions resident in a memory to perform the previously discussed methods involved in the first level authentication. Any or all of the previously explained resources shown in FIG. 8A may be controlled by the processor which interprets various instructions to, for instance, read data, scan data, store data, interpret data, transmit data, display data, etc. in accordance with all of the embodiments of the present invention. FIG. 8B shows the second module of the process involving the second level authentication. Here, the processor further involves a secure smart card module in conjunction with any or all of the exemplary physical elements and memory contents such as instructions and/or data to, for instance, read data, scan data, store data, interpret data, transmit data, display data, etc. to execute the previously discussed methods in accordance with all of the embodiments of the present invention.

The present invention yields vast improvements over the status quo. Any standard wireless communication device may be converted into a device capable of transmitting and receiving sensitive or confidential data with the addition of a smart card module. Multiple security levels are provided to ensure that both the user and the device are qualified to receive the data, and this may be further limited by time, location, etc. Knowledge of a security code and/or user identification is not enough to gain access to sensitive or confidential data. The requirement to scan identification codes adds an additional layer of security to the transaction. Finally, the loss or theft of the wireless communication device will not lead to an information leak because a token session ID may be limited by time of day, duration, number of information requests, geographical location, etc.

While the invention has been described in preferred embodiments, various changes can be made therein without departing from the spirit and scope of the invention, as described in the appended claims, in which:

What is claimed is:

1. A method, comprising:
receiving first level authentication information from a user at a wireless device;
authenticating the user to use the wireless device;
requesting authorization to utilize secure resources stored in a secure smart card module of the wireless device b transmitting at least the first level authentication information from the wireless device to a remote resource via wireless communication;

receiving from the remote resource second level authentication information including a token session ID at the wireless device via wireless communication in response to validation of the first level authentication information;

activating the secure resources stored in the secure smart card module of the wireless device using at least the received token session ID;

interacting with the secure resources to create an information retrieval request by scanning machine-readable media associated with the information to be retrieved;

transmitting at least the token session ID and the information retrieval request to the remote resource via wireless communication; and receiving a response to the information retrieval request in the wireless device from the remote resource in response to validation of at least the token session ID and the scanned machine-readable information.

2. The method of claim 1, wherein the secure resources comprise at least a secure software application recorded on the secure smart card module;

the secure smart card module having at least a processor, a memory, and an interface with which to connect to the wireless communication device.

3. The method of claim 2, wherein the secure software application residing in the secure smart card module memory is utilized to formulate the information retrieval request, said secure application providing at least a user interface configured for receiving the scanned information.

4. The method of claim 1, wherein the first level authentication information includes at least identification information and a password, and the token session ID is limited by one or more of a set time, a duration, a number of information retrieval requests or a geographic location.

5. The method of claim 1, wherein the secure smart card module is a removable memory device that is communicatively coupled to an apparatus.

6. The method of claim 1, wherein the secure resources comprise at least a secure software application that may only be activated using the second level authentication.

7. The method of claim 1, wherein scanning machine-readable media comprises loading information into an apparatus using optical, electronic or magnetic scanning.

8. A computer program product comprising computer executable program code recorded on a computer readable storage medium, when the executable program code implemented by a computing device, cause the computing device to execute, the steps:

receiving first level authentication information from a user at a wireless device;

authenticating the user to use the wireless device;

requesting authorization to utilize secure resources stored in a secure smart card module of the wireless device by transmitting at least the first level authentication information from the wireless device to a remote resource via wireless communication;

receiving from the remote resource second level authentication information including a token session ID at the wireless device via wireless communication in response to validation of the first level authentication information;

activating the secure resources stored in the secure smart card module of the wireless device using at least the received token session ID;

interacting with the secure resources to create an information retrieval request by scanning machine-readable media associated with the information to be retrieved;

transmitting at least the token session ID and the information retrieval request to the remote resource via wireless communication; and receiving a response to the information retrieval request in the wireless device from the remote resource in response to validation of at least the token session ID and the scanned machine-readable information.

9. The computer program product of claim 8, wherein the secure resources comprise at least a secure software application recorded on the secure smart card module;

the secure smart card module having at least a processor, a memory, and an interface with which to connect to the wireless communication device.

10. The computer program product of claim 9, wherein the secure software application residing in the secure smart card module memory is utilized to formulate the information retrieval request, said secure application providing at least a user interface configured for receiving the scanned information.

11. The computer program product of claim 8, wherein the first level authentication information includes at least identification information and a password, and the token session ID is limited by one or more of a set time, a duration, a number of information retrieval requests or a geographic location.

12. The computer program product of claim 8, wherein the secure smart card module is a removable memory device that is communicatively coupled to an apparatus.

13. The computer program product of claim 8, wherein the secure resources comprise at least a secure software application that may only be activated using the second level authentication.

14. The computer program product of claim 8, wherein scanning machine-readable media comprises loading information into an apparatus using optical, electronic or magnetic scanning.

15. An apparatus, comprising:

a processor; and at least one memory including executable instructions, the at least one memory and the executable instructions configured to, in cooperation with the at least one processor, cause the apparatus to perform at least the following:

receive first level authentication information from a user;

authenticate the user to use the apparatus;

transmit at least the first level authentication information to a remote resource via wireless communication;

request authorization to utilize secure resources stored in a secure smart card module of the apparatus by transmitting at least the first level authentication information from the apparatus to a remote resource via wireless communication; receive from the remote resource second level authentication information including a token session ID at the apparatus via wireless communication in response to validation of the first level authentication information;

activate the secure resources stored in the secure smart card module of the apparatus using at least the received token session ID;

interact with the secure resources to create an information retrieval request by scanning machine-readable media associated with the information to be retrieved;

transmitting at least the token session ID and the information retrieval request to the remote resource via wireless communication; and receiving a response to the information retrieval request in the wireless device from the remote resource in response to validation of at least the token session ID and the scanned machine-readable information.

16. The apparatus of claim 15, wherein the secure resources comprise a secure smart card module having at least a processor, a memory, and an interface with which to connect to the apparatus.

17. The apparatus of claim 16, wherein the secure software application residing in the smart card module memory is utilized to formulate the information retrieval request, said secure application providing at least a user interface configured for receiving the scanned information.

18. The apparatus of claim 15, wherein the first level authentication information includes at least identification information and a password, and the token session ID is limited by one or more of a set time, a duration, a number of information retrieval requests or a geographic location.

19. The apparatus of claim 15, wherein the secure smart card module is a removable memory device that is communicatively coupled to an apparatus.

20. The apparatus of claim 15, wherein the secure resources comprise at least a secure software application that may only be activated using the second level authentication.

21. The apparatus of claim 15, wherein scanning machine-readable media comprises loading information into an apparatus using optical, electronic or magnetic scanning.

22. A system, comprising:
a machine readable media associated with information to be retrieved;

an apparatus comprising a scanner configured to read the machine-readable media and a communication module configured to communicate wirelessly; and a server comprising a communication module configured to communicate wirelessly with at least the apparatus;

the apparatus being further configured to receive first level authentication information from a user, to authenticate the user to use the apparatus, to request authorization to utilize secure resources stored in a secure smart card module of the apparatus by transmitting the first level authentication information to the server via wireless communication and to receive from the server second level authentication information including at least a token session ID via wireless communication in response to the server validating the first level authentication information;

the apparatus further being configured to utilize the token session ID when activating the secure resources stored in the secure smart card module residing in the apparatus, to create an information retrieval request by scanning the machine-readable media, and to transmit at least the token session ID and the information retrieval request to the server via wireless communication; and the apparatus further being configured to receive a response to the information retrieval request in response to the server validating the token session ID and the scanned machine-readable information.

* * * * *

UNITED STATES PATENT AND TRADEMARK OFFICE
CERTIFICATE OF CORRECTION

PATENT NO. : 7,694,331 B2  Page 1 of 1
APPLICATION NO. : 11/095532
DATED : April 6, 2010
INVENTOR(S) : Vesikivi et al.

It is certified that error appears in the above-identified patent and that said Letters Patent is hereby corrected as shown below:

Column 10

Line 67 (Claim 1), "module of the wireless device b" should read,

--module of the wireless device by--.

Signed and Sealed this

Thirteenth Day of July, 2010

David J. Kappos
*Director of the United States Patent and Trademark Office*